Figure 1:
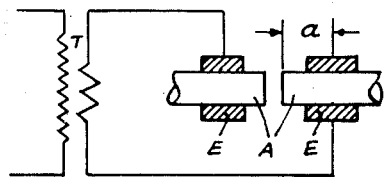

May 13, 1958  M. V. BERG  2,834,871
PROCESS FOR MANUFACTURING WELDED CAST IRON
TUBES BY ELECTRICAL RESISTANCE WELDING
Filed Aug. 2, 1952

MANFRED VOLDEMAR BERG
INVENTOR his ATT'YS.

United States Patent Office 2,834,871
Patented May 13, 1958

2,834,871

PROCESS FOR MANUFACTURING WELDED CAST IRON TUBES BY ELECTRICAL RESISTANCE WELDING

Manfred V. Berg, Gothenburg, Sweden

Application August 2, 1952, Serial No. 302,342

4 Claims. (Cl. 219—104)

The present invention relates to methods for the flash welding of cast iron pieces and more particularly to methods which are applicable to relatively heavy pieces by means of a resistance flash welding machine, cast iron of a special composition being utilized in order to make the welding operation possible.

Hitherto it has not been considered possible to weld cast iron in a resistance flash welding machine. From this it can be concluded that attempts have been made but that the results obtained have proved not to have such physical properties that they can be considered to be of any importance for industrial purposes.

However, tests have proved that an adequate welding result can be obtained if the welding is carried out in accordance with the process described below and if cast iron is used having carbon, silicon and phosphorus contents lying within the limits stated below.

If cast iron is to be welded successfully in a resistance flash welding machine the general properties of the cast iron, its most important components and the influence of these components on the physical properties of the cast iron must be known. Conditions which directly influence the welding of cast iron are therefore related below.

1. PERCENTAGE OF CARBON

As known the term cast iron is used for alloys of iron and carbon in which the percentage of carbon exceeds 1.7%. Cast iron having a percentage of carbon lying between 1.7 and 4.2% is called undereutectic, and when the percentage of carbon exceeds 4.2% it is called overeutectic. An alloy in which the percentage of carbon amounts to 4.2% is called eutectic. This alloy has the lowest melting point (1139° C.) of any alloy of iron and carbon, is composed of uniform crystals and melts at a constant temperature like chemically pure metals.

For practical purposes undereutectic cast iron, or so called grey cast iron, is almost exclusively used. Cast iron having a percentage of carbon higher than 4.2% is seldom used in practice. The overeutectic cast iron separates graphite abundantly from the melt and has such a coarse crystalline structure that it can be rent asunder by the point of a knife. In this case the iron has poor physical properties.

A low percentage of carbon, however, also has its drawbacks as far as practical use is concerned. The lower the percentage of carbon, the stronger is indeed the cast iron, but only to a certain degree because (a) The tension in the cast iron increases when the percentage of carbon is low.

(b) The iron becomes harder from the point of view of working it.

(c) The iron becomes viscous more quickly, as a higher melting temperature is required.

(d) A larger amount of piping is obtained in the moulds.

The most easily worked cast iron has a percentage of carbon nearer the eutectic, flows easily, is easy to work and has a smaller amount of piping. However, it has coarse crystalline structure at the surface of fracture and poor physical properties.

Cast iron in the solid state contains free carbon (graphite) and iron carbide ($Fe_3C$) known as cementite. The iron in molten state can absorb more carbon than it can retain when solidifying, for which reason the free carbon, when certain conditions are present, separates as graphite. Graphite separates as usual if the iron contains at least 2.5% C and more easily if it contains a higher percentage of silicon. If silicon is entirely absent there will be no separation of graphite.

The physical properties are reduced within certain limits with increasing percentage of graphite. Both the bending strength and the tensile strength of the cast iron decrease with increasing percentage of graphite in relation to the bound carbon without taking into consideration the percentage of silicon. The silicon itself has very little influence on the resistance, the change of which therefore must be due to the percentage of graphite. As pointed out above the silicon influences the separation of graphite. The higher the percentage of silicon, the more carbon separates in the form of graphite.

Apart from the above-mentioned fact, one other fact, namely the cooling speed of the melt, has a great influence on the separation of graphite. The more slowly an iron-carbon alloy containing silicon solidifies, the more graphite separates.

Depending on how the graphite occurs in the iron the effect on the resistance is as follows:

The conditions being otherwise entirely alike, cast iron with finely divided graphite has substantially greater resistance than iron with coarse graphite flakes. If the amount of graphite and the distribution of the same are alike in two pieces of cast iron, the piece with a basic structure which is purely perlitic, has better resistance qualities than the piece which has a ferric or perlitic-ferric basic structure. As a common rule it can be said that the tensile strength increases with increasing perlitic basic structure in the iron. When the said structure reaches a maximum, i. e. 100%, the resistance can only be further increased if the graphite is more finely divided.

2. PHOSPHORUS

The percentage of phosphorus increases the resistance with percentages up to 0.5%, but beyond this value the resistance value decreases. When the percentage of phosphorus is increased up to 1.15% the impact strength can be reduced by 50–60%. In molten condition addition of phosphorus makes the iron highly fluent, in solid condition, however, the iron becomes more brittle. The brittleness increases with the bound carbon content of the iron, and therefore iron rich in graphite endures a larger amount of phosphorus.

An account will now be given with reference to the accompanying drawing of the welding of cast iron in a resistance flash welding machine.

Figure 2:
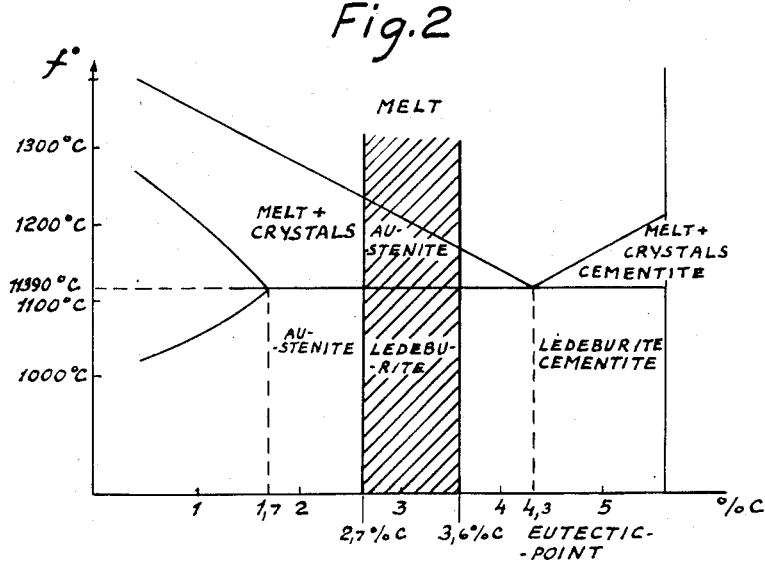

In the drawing,

Figure 1 shows diagrammatically a device for carrying out the method according to the invention, and Figure 2 shows an iron-carbon diagram showing suitable limits for the percentage of carbon.

Electric resistance welding is press-welding, that is, the pieces of iron, heated so as to become pasty, or even fluent, are welded together under high pressure without supplying additional material. An electric current from a transformer T serves in such a case as source of heat. The low voltage alternating current, for instance 7–15 volts, flows through the pieces with very high current intensity, and, owing to the internal resistance of said pieces and the electrical resistance at the abutting surfaces, i. e. the welding points, heats the pieces so that they become pasty or molten. In Figure 1 E designates copper electrodes, A the pieces to be welded together, and $a$ the length between the clamping points.

All materials which can be welded when in pasty condition can be welded by means of electric resistance welding, for example nearly all kinds of steel, steel casting, certain kinds of malleable iron castings, aluminum and its alloys, copper and its alloys, nickel, tungsten, cobalt, tantalum, silver, gold, platinum etc. Hitherto it has not been considered possible to resistance-weld cast iron. The welding is fundamentally carried out as per Figure 1.

A large number of tests made now show that cast iron can be welded by resistance welding when certain conditions are present, good resistance or physical strength of the welded joint being obtained, for instance, in centrifugally cast tubes a tensile strength of between 20 and 26.7 kg./mm.$^2$ and complete water-tightness with an internal water pressure of 200 atmospheres. The bending strength is between 35 and 45 kg./mm.$^2$.

If one assumes that cast iron can be used in practice in a range between certain limits dependent on the percentage of carbon, this can serve as a starting point for explaining the good results of the welding.

In the iron-carbon diagram (Figure 2) this range, about 2.7–3.6% C, has been marked. It will be seen from this diagram that two pieces of cast iron which do not have equal percentages of carbon and which are to be welded together, do not reach the same melting conditions if, for instance, one piece contains 2.8% carbon and the other one 3.5%. The piece containing 2.8% must be heated to 1295° C. while the piece containing 3.5% must be heated only to 1215° C. in order that all crystals shall be melted. If the analysis of these pieces is not known before the welding, the result may be that there will be unmelted crystals on one joint surface and the pieces therefore are not completely melted together. The result is evident when the pieces welded together are subjected to tensile strength tests and the welding seam to X-ray examination, namely that the welding is not complete, there being small surfaces in the seam where no melting together has taken place.

Furthermore, cast iron in pasty or molten condition is liable to combine chemically with the oxygen of the air and to form iron oxide which, closed in a welding seam, is injurious as it reduces the resistance, particularly to dynamic strain. To prevent this oxidation process, or to reduce as far as possible the influence of the oxides already formed, the cast iron is resistance welded by a method which includes a pickling step and in which a protective atmosphere is formed to inhibit oxidation. According to this method, the two castings are heated to an appropriate temperature and are immersed to a depth of a few millimeters in a pickling solution (in accordance with the size of the welding area) whereafter the workpieces to be welded are impacted together. In the course of the impacting, the last remaining oxides are pressed out of the welding area.

A number of tests made show that the amount of remaining oxides directly depends on the specific impacting pressure. When the specific pressure is 2.5 kg./mm.$^2$ the welding area, oxide inclusions in the weld still appeared clearly, while on the other hand with a pressure of from 5 to 9 kg./mm.$^2$ conditions were more favourable, so that the bending strength and the tensile strength of the welded pieces increased considerably.

Thus, the specific impacting pressure ought to be at least 3 kg./mm.$^2$ welding area, preferably from 3 to 5 kg./mm.$^2$. In addition, when cast iron is resistance welded, it must be observed that by supplying high electrical energy care is taken to carry out the welding quickly with a heating zone as restricted as possible in order that the material subjected to resistance butt welding shall be quickly freed from the supplied heat. Only in this way is it possible to eliminate the separation of graphite lamellae and obtain finely divided graphite instead, and to prevent the heat from spreading to the rest of the piece and to prevent cracks from being formed.

The tensile strength of a cast iron piece containing 3% carbon, 1.85% silicon, 0.67% manganese, 0.45% phosphorus and 0.12% sulphur was 27 kgs./mm.$^2$. Four conditions for obtaining a good result are stated below:

Condition 1

If the pieces of cast iron are to be welded together in a suitable way, it is necessary that the percentage of carbon of the parts to be welded together does not differ more than 0.5% and to obtain the higher values of weld strength the percentage of carbon in the cast iron should lie between 2.7 and 3.6%. With regard to the above-mentioned general properties of cast iron, the basic material ought not to contain more than 1.9% silicon and in addition it must have a structure, either with finely divided graphite or with substantially bound carbon and a smaller amount of separated graphite. This is necessary to effect a good resistance, to achieve a structure like that of the basic material, and to reduce the intercrystalline tensions.

In order to avoid a ferritic structure in the weld or near the welding point by cooling the heating zone too rapidly the temperature is maintained normally decreasing when welding in a room, but when welding in the open air, particularly in winter, the heat of the machine can be utilized to prevent too rapid cooling of the heating zone as dangerous tensions might remain in the castings. When the welding temperature is 500° or lower the decrease of temperature must take place rapidly, and this is brought about by keeping the tube in the machine with the water-cooled jaws rapidly removing the heat.

Condition 2

To obtain a good weld the percentage of phosphorus of the two working pieces ought not to differ by more than 0.2% and in no case should it exceed 0.5% in either of the pieces. This is because of the fact that there should be a low separation of graphite and that the percentage of phosphorus in this case makes the castings brittle if the percentage exceeds 0.5%. Moreover, a larger amount of phosphorus makes the melt more fluent which tends to cause the piece with a higher percentage of phosphorus to "flow," thereby preventing a good welding together of the pieces.

Condition 3

To eliminate oxidation of the cast iron intended for melting, the welding is carried out with a specific impacting or welding pressure of 3–5 (or more) kgs./mm.$^2$ in the welding area in addition to which as restricted a heating zone as possible is effected by supplying a large welding power. The impacting pressure of 3 kg./mm.$^2$ is to be considered as minimum. Tests made with cast tubes showed that a welding current of 30–35 ka. in the welding was necessary which corresponds to a welding power of 230–270 kva. for a welding area of 2600 mm.$^2$. For a tube area of 18,000 mm.$^2$ the corresponding power will be about 1500 kva. If a lower power is used the pieces must be heated a longer time.

With round cast iron rods a weld having a tensile strength up to 24.7 kg./mm.$^2$ was obtained. The welding power was in this case 125 kva., the welding area being 700 mm.$^2$. Due to the fact that the welding power was high the welding time was considerably shorter and no inclusions of oxide could be observed in the weld. This explains the good mechanical resistance qualities of the welded seam.

A comparatively good weld was also obtained when the welding power was about 60–70 kva.

Condition 4

If the analysis of the two pieces is known as described above, and if a difference in the heating of the welded portions is to be expected in these pieces, the length $a$ (see Figure 1) of the piece which according to calculation will attain the necessary welding temperature last should be reduced, so that by reducing the volume of metal required to be heated the attainment of the right welding temperature in this slower heating piece is hastened. To calculate the distance $a$ is a simple matter, the necessary melting temperature being determined from the iron-carbon diagram.

When manufacturing cast iron tubes with flanges at both ends it is not possible to use centrifugal casting in a mould as the tube shrinks during the solidification of the molten iron causing the flanges to be broken away. Centrifugally cast flanged tubes cannot therefore be manufactured.

The present invention relates to a method according to which cast iron tubes with centrifugally cast parts with flanges at both ends can be manufactured. It is to be preferred that the cast iron flanges are manufactured individually with their appurtenant tube pieces whereafter the tube pieces during local heating of the welding seams and under pressure are pressed together and melted together without supply of other material than a fusing agent. The length of the tube pieces is of no importance.

When heating and pressing together the tube parts a known flash welding machine is used in which the tube parts are clamped in their individual jaws which are arranged so as to be connected to electrical wires for heating the welding point. When the parts on both sides of the joint have been sufficiently heated, they are conveyed by the machine towards each other under high pressure. The temperature and the pressure are determined in accordance with the size of the castings and the nature of the material.

In view of the fact that the material is cast iron the welding seams are heated rapidly with a high welding power to avoid formation of cracks in the castings, if any, a restricted heating zone being maintained. The finished tube has proved to be tight and free from pores or slick as the welding seam is protected from oxidisation by pickling and high welding or impacting pressure. The castings are water-tight for water pressures which can be allowed for such tubes. The weld is as soft as the rest of the castings. Tensile strength tests show values corresponding to those of the rest of the castings. Metallurgic tests show that the crystalline structure of the weld is like that of the rest of the tube.

The method is cheap as no mandrels or cores need be used and the work is simple and quick. Moreover, tubes of any desired length can be made more cheaply than with earlier known methods.

Having now described my invention, what I claim as new and desire to secure by Letters Patent is:

1. The method of producing welded cast iron articles which comprises: effecting electric current flow through pieces by flash welding means, the said pieces of cast iron having a total percentage of carbon within the range of from 2.7 to 3.6% with a mutual variation in carbon content not exceeding 0.5% and containing more totally bound carbon than free graphite, a percentage of silicon not exceeding 1.9% and a percentage of phosphorus not exceeding 0.5%, with a mutual variation in phosphorus content not exceeding 0.2%; rapidly cooling the weld to a temperature of about 500° C.; and slowly cooling the weld from said temperature of about 500° C. to room temperature.

2. The method according to claim 1 including the steps of: removing oxidation from the abutting surfaces of the pieces of cast iron being welded by pickling; and preventing the formation of further oxidation by exerting a welding pressure of not less than 3 kilograms per square millimeter between the surfaces being welded.

3. The method according to claim 1 wherein the abutting surfaces of the pieces of cast iron being welded are rapidly heated by the action of electrical energy in the range of 0.05 to 0.06 kilovolt-amperes per square millimeter of welding surfaces at a welding voltage in the range of from 7 to 15 volts.

4. The method according to claim 1 wherein the heating times of the abutting surfaces of the pieces of cast iron being welded are equalized by reducing the volume of metal which is required to be heated in the case of the slower heating surface, the heating time of each piece being determined with reference to the time required to attain a temperature determined by the individual carbon content of each of the two pieces at which all of the crystals at the welding surface of each piece are melted.

References Cited in the file of this patent

UNITED STATES PATENTS

| | | |
|---|---|---|
| 455,420 | Thomson | July 7, 1891 |
| 1,117,916 | Schmidt | Nov. 17, 1914 |
| 2,193,490 | Rehse | Mar. 12, 1940 |
| 2,243,488 | Rehse | May 27, 1941 |